United States Patent
Sakamoto

(10) Patent No.: US 8,248,623 B2
(45) Date of Patent: Aug. 21, 2012

(54) PRINTING APPARATUS

(75) Inventor: Kana Sakamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1182 days.

(21) Appl. No.: 12/056,470

(22) Filed: Mar. 27, 2008

(65) Prior Publication Data

US 2008/0316511 A1 Dec. 25, 2008

(30) Foreign Application Priority Data

Mar. 29, 2007 (JP) ................................ 2007-089238

(51) Int. Cl.
*G06F 3/12* (2006.01)
(52) U.S. Cl. ......... 358/1.13; 358/1.9; 358/1.15; 399/85; 101/45
(58) Field of Classification Search .................. None
See application file for complete search history.

(56) References Cited

U.S. PATENT DOCUMENTS

| | | | |
|---|---|---|---|
| 5,971,582 A | 10/1999 | Fuji | |
| 6,788,907 B1 * | 9/2004 | Burkes et al. | 399/82 |
| 7,123,849 B2 * | 10/2006 | Ishii et al. | 399/28 |
| 7,667,861 B2 * | 2/2010 | Umetani et al. | 358/1.12 |
| 2003/0164971 A1 * | 9/2003 | Kidani et al. | 358/1.13 |
| 2003/0234957 A1 | 12/2003 | Ohara | |
| 2005/0069334 A1 * | 3/2005 | Hashimoto et al. | 399/25 |
| 2007/0092323 A1 * | 4/2007 | Lin et al. | 400/61 |

FOREIGN PATENT DOCUMENTS

| | | |
|---|---|---|
| EP | 1339218 | 8/2003 |
| JP | 10-063450 | 3/1998 |
| JP | 2000-318220 | 11/2000 |
| JP | 2001-301240 | 10/2001 |
| JP | 2001-305818 | 11/2001 |
| JP | 2002-278724 | 9/2002 |
| JP | 2003-207970 | 7/2003 |
| JP | 2003-262999 | 9/2003 |

(Continued)

OTHER PUBLICATIONS

European Search Report Application No. 08006096.5 dated Sep. 15, 2009.

(Continued)

*Primary Examiner* — Marivelisse Santiago Cordero
*Assistant Examiner* — Miya J Cato
(74) *Attorney, Agent, or Firm* — Banner & Witcoff, Ltd.

(57) ABSTRACT

A printing apparatus, comprising: a printing unit that prints an image on a recording medium in a color mode or a monochrome mode based on a first job; a switching unit that performs a switching operation to switch between the color mode upon printing a color page and the monochrome mode upon printing a monochrome page; a first computing unit that computes, based on a switching time required for the switching operation, the maximum number of switching actions at which a printing turnaround time from a printing start time to a printing stop time is not more than a first time limit from the printing start time to a predetermined time limit; and a first limiting unit that restricts the switching operation based on a number of switching actions determined by the first computing unit.

12 Claims, 12 Drawing Sheets

FOREIGN PATENT DOCUMENTS

| JP | 2003-280867 | 10/2003 |
| JP | 2003-326774 | 11/2003 |
| JP | 2003-341180 | 12/2003 |
| JP | 2005-035133 | 2/2005 |
| JP | 2006-218804 | 8/2006 |
| JP | 2006-256269 | 9/2006 |
| JP | 2007-048001 | 2/2007 |

OTHER PUBLICATIONS

Japanese Office Action: Japanese Patent Application No. 2007-089238, Reference No. 2006-03808, Dispatch No. 689075, Dispatch Date Nov. 11, 2008.

* cited by examiner

FIG. 8

CONFIGURATION EXAMPLE 1 OF GROUPS OF PAGES OF JOB 1

| PAGE GROUP | P 1 | P 2 | P 3 | P 4 | P 5 | P 6 | P 7 |
|---|---|---|---|---|---|---|---|
| COLOR PAGE OR MONOCHROME PAGE | MONO-CHROME | COLOR | MONO-CHROME | COLOR | MONO-CHROME | COLOR | MONO-CHROME |
| NUMBER OF PAGES | 1 PAGE | 3 PAGES | 3 PAGES | 1 PAGE | 4 PAGES | 2 PAGES | 2 PAGES |

SWITCHING 1  SWITCHING 2  SWITCHING 3  SWITCHING 4  SWITCHING 5  SWITCHING 6

CONFIGURATION EXAMPLE 2 OF GROUPS OF PAGES OF JOB 1

| PAGE GROUP | P 1 | P 2 | P 3 | P 4 | P 5 | P 6 | P 7 |
|---|---|---|---|---|---|---|---|
| COLOR PAGE OR MONOCHROME PAGE | COLOR | MONO-CHROME | COLOR | MONO-CHROME | COLOR | MONO-CHROME | COLOR |
| NUMBER OF PAGES | 1 PAGE | 3 PAGES | 3 PAGES | 1 PAGE | 4 PAGES | 2 PAGES | 2 PAGES |

SWITCHING 1  SWITCHING 2  SWITCHING 3  SWITCHING 4  SWITCHING 5  SWITCHING 6

PRINTING APPARATUS

CROSS REFERENCE TO RELATED APPLICATION

The present application claims priority from Japanese Patent Application No. 2007-089238, which was filed on Mar. 29, 2007, the disclosure of which is herein incorporated by reference in its entirety.

TECHNICAL FIELD

The present invention relates to a printing apparatus.

BACKGROUND

A conventional printing apparatus is disclosed in Patent Document 1. This printing apparatus includes a printing unit for printing an image on a recording medium in a color mode or a monochrome mode based on a job, a switching unit for performing a switching operation to switch between the color mode upon printing a color page and the monochrome mode upon printing a monochrome page, and a limiting unit for restricting the switching operation in order to shorten the printing turnaround time.

As shown in FIGS. 5(b) and (c), FIGS. 6(b) and (c), and FIGS. 7(b) and (c) of Patent Document 1, the conventional printing apparatus configured in this manner allows for providing a job of mixed color pages and monochrome pages with a reduced printing turnaround time by the limiting unit restricting the switching operation to print all the pages in the color mode. Thus, in order to complete the printing by a predetermined time limit, this printing apparatus can do so on time by the limiting unit shortening the printing turnaround time even when the time limit could not be kept by faithfully executing the switching operations.

[Patent Document 1] Japanese Published Unexamined Patent Application No. 2003-326774

SUMMARY

However, in order to reduce running costs, the aforementioned conventional printing apparatus is required to provide the longest possible service life to those consumables which are consumed for printing an image on a recording medium. More specifically, when the printing apparatus is a laser printer, a toner serving as a coloring material, a developing roller, and a photosensitive material are consumed for execution of printing. This requires adding toner or replacing parts, thereby readily resulting in an increase in running costs. However, when the aforementioned conventional printing apparatus restricts switching operations to shorten the printing turnaround time, the number of monochrome pages which should be printed primarily in the monochrome mode but actually printed in the color mode is simply increased. Accordingly, for the aforementioned conventional printing apparatus, it is difficult to shorten the printing turnaround time and extend the service life of consumables as long as possible at the same time.

The present invention was developed in view of the aforementioned conventional problems. It is therefore an object of the present invention to provide a printing apparatus which can shorten the printing turnaround time and extend the service life of consumables as long as possible at the same time.

A printing apparatus according to a first aspect of the invention includes: a printing unit that prints an image on a recording medium in a color mode or a monochrome mode based on a first job; a switching unit that performs a switching operation to switch between the color mode upon printing a color page and the monochrome mode upon printing a monochrome page; a first computing unit that computes, based on a switching time required for the switching operation, the maximum number of switching actions at which a printing turnaround time from a printing start time to a printing stop time is not more than a first time limit from the printing start time to a predetermined time limit; and a first limiting unit that restricts the switching operation based on a number of switching actions determined by the first computing unit.

The printing apparatus according to the first aspect of the invention configured in this manner allows the first computing unit and the first limiting unit to reduce the number of switching actions in the switching operation to such an extent that allows for completing the printing by the time limit. It is thus possible to accordingly reduce the switching time and thereby shorten the printing turnaround time.

Furthermore, this printing apparatus will not allow the first computing unit and the first limiting unit to excessively reduce the number of switching actions with respect to the time limit. It is thus possible to reduce the number of as many monochrome pages as possible which should be printed primarily in the monochrome mode but printed in the color mode, thereby suppressing the execution of printing in the color mode.

Accordingly, the printing apparatus according to the first aspect of the invention can not only shorten the printing turnaround time but also extend the service life of consumables as long as possible.

When a laser printer is employed as the printing apparatus, those consumables which are consumed when an image is printed on a recording medium may include, for example, a toner, a developing roller, and a photosensitive material. When an ink jet printer is used as the printing apparatus, the consumables may include ink and an ink eject unit.

The time limit may be defined in any manner; however, it may include, for example, the automatic power supply OFF time, the automatic correction start time, the automatic cleaning start time, the automatic FAX receipt time, or the printing time limit of the printing apparatus, which are defined by the user.

The printing apparatus according to the second aspect of the invention may also be adopted such that the time limit is a printing start time for second job.

The printing start time of second job is designated relatively often in printing apparatuses, the printing apparatus according to the first aspect of the invention can fully make the effects.

The printing apparatus according to the third aspect of the invention may also be adopted such that the first limiting unit preferably restricts the switching operation for one or more groups of those of consecutive monochrome pages in the first job, the one or more groups being restricted by the first limiting unit and having the minimum sum of pages (third aspect).

To extend the service life of consumables as long as possible, it is primarily desirable to print monochrome pages in the monochrome mode. The printing apparatus of the invention according to the third aspect can reduce the number of as many monochrome pages as possible which should be printed primarily in the monochrome mode but printed in the color mode, thereby ensuring that the execution of printing in the color mode is suppressed. It is thus ensured that this printing apparatus can make use of the operational effects of the present invention.

The groups of pages include those which have not only a plurality of pages but also only one page.

The printing apparatus according to the fourth aspect of the invention includes a first designating unit for designating the printing start time, and a prohibiting unit for prohibiting designation by the first designating unit when the printing turnaround time exceeds the first time limit, even with the number of switching actions being zero.

In this case, this printing apparatus can prevent the printing operation of first job from overlapping with the printing operation of second job which has to be executed after the first time limit.

The printing apparatus according to the fifth aspect of the invention may also include a second designating unit for designating the printing stop time; a second computing unit for computing, based on the switching time, the maximum number of switching actions at which a printing turnaround time from the printing start time of second job to the printing stop time of second job designated by the second designating unit is not more than a second time limit from the printing stop time of the first job to the printing stop time of second job; and a second limiting unit for restricting the switching operation based on a number of switching actions determined by the second computing unit. In this printing apparatus, the prohibiting unit may prohibit designation by the first designating unit when the printing turnaround time exceeds the second time limit, even with the number of switching actions determined by the second computing unit being zero.

In this case, this printing apparatus allows for extending a designated range of the printing start time of first job when the printing turnaround time of second job can be shortened.

A printing apparatus according to a sixth aspect of the invention includes a printing unit for printing an image on a recording medium in a color mode or a monochrome mode based on a job; a switching unit for performing a switching operation to switch between the color mode upon printing a color page and the monochrome mode upon printing a monochrome page; a third computing unit for reducing the number of switching actions in the switching operation at a predetermined rate and computing the controlled number of switching actions; a setting unit for allowing a user to set the rate; and a third limiting unit for restricting the switching operation based on the controlled number of switching actions.

The printing apparatus according to the sixth aspect of the invention configured in this manner allows the user to set the rate as desired, thereby providing control to the extent that the printing turnaround time of the job is shortened. Accordingly, even when the user instructed to start printing of a job but the instruction was rejected because the printing could not be completed by the time limit, the user can manually reduce the number of switching actions to such an extent that allows for completing the printing by the time limit. It is thus possible to accordingly reduce the switching time and thereby shorten the printing turnaround time.

Furthermore, this printing apparatus allows the user to set the rate so as not to excessively reduce the number of switching actions with respect to the time limit. This makes it possible to reduce as many monochrome pages as possible which should be printed primarily in the monochrome mode but printed in the color mode, thereby suppressing the execution of printing in the color mode.

Accordingly, the printing apparatus according to the second aspect of the invention can not only shorten the printing turnaround time but also extend the service life of consumables as long as possible.

Furthermore, even when no time limit is specified in this printing apparatus and the user wants to give a higher priority to the shortening of the printing time or the reduction of toner consumption, the user can increase or decrease the rate as the case may be, thereby allowing for controlling the extent that the switching operation is restricted.

The printing apparatus according to the seventh aspect of the invention includes the third limiting unit preferably restricts the switching operation for one or more groups of those of consecutive monochrome pages in the job, the one or more groups being restricted by the third limiting unit and having the minimum sum of pages.

The printing apparatus of the seventh aspect can reduce the number of as many monochrome pages as possible which should be printed primarily in the monochrome mode but printed in the color mode, thereby ensuring that the execution of printing in the color mode is suppressed. It is thus ensured that this printing apparatus can make use of the operational effects of the present invention.

BRIEF DESCRIPTION OF THE DRAWINGS

Illustrative aspects of the invention will be described in detail with reference to the following figures wherein:

FIG. 8 relates to the printing apparatus according to the first embodiment, illustrating an explanatory view of the configuration examples 1 and 2 of groups of pages of job 1;

DETAILED DESCRIPTION OF THE PREFERRED EMBODIMENTS

Now, the present invention will be explained below with reference to the accompanying drawings in accordance with first and second embodiments as embodied in the present invention.

First Embodiment

The printing apparatus of the first embodiment is a direct tandem color laser printer. Now, description will be made for the configuration of the printing apparatus.

1. Configuration of the Printing Apparatus

The printing apparatus includes a printing unit 70 shown in FIG. 1, a switching unit, and a controller for controlling other components. In addition, no description or only a brief description will be made for those components of the printing unit 70, the switching unit, and the controller which are commonly known.

1.1 Printing Unit

Figure 1A:
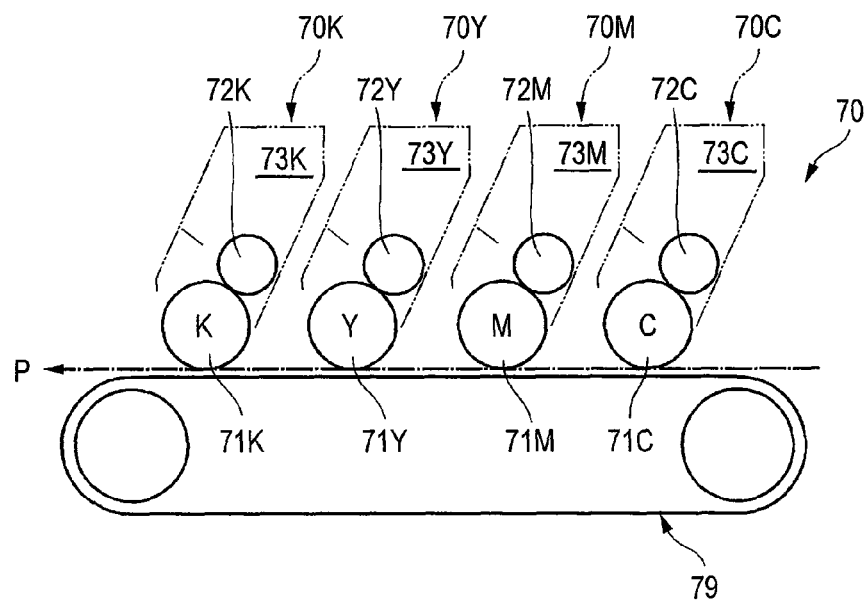
FIG. 1 relates to a printing apparatus according to a first embodiment, FIG. 1A being a schematic view illustrating a printing unit in a color mode, FIG. 1B being a schematic view illustrating the printing unit in a monochrome mode.

As shown in FIG. 1A, the printing unit 70 includes four process cartridges 70C, 70M, 70Y, and 70K, and a conveyance unit 79 for conveying sheets or OHP sheets (hereinafter simply referred to as a "sheet") serving as a recording medium along a conveying path P.

The process cartridges 70C, 70M, 70Y, and 70K correspond to toners (cyan (C), magenta (M), yellow (Y), black (K)) or four coloring materials, and have a commonly-known structure which includes toner storage chambers 73C, 73M, 73Y, and 73K; developing rollers 72C, 72M, 72Y, and 72K; and photosensitive materials 71C, 71M, 71Y, and 71K. The four photosensitive materials 71C, 71M, 71Y, and 71K are disposed in series along the conveying path P.

When the controller receives a job transmitted from an external information terminal, the controller controls the printing unit 70 based on the job to activate the conveyance unit 79 and each of the process cartridges 70C, 70M, 70Y, and 70K as appropriate. This causes an electrostatic latent image to be formed on the photosensitive materials 70C, 70M, 70Y, and 70K. Corresponding to the electrostatic latent image, the toner of each color is supplied from the toner storage chambers 73C, 73M, 73Y, and 73K via the developing rollers 72C, 72M, 72Y, and 72K to the photosensitive materials 70C, 70M, 70Y, and 70K, and then transferred to a sheet. In this manner, the printing unit 70 can use the toners of four colors to print a color image on a sheet. FIG. 1A shows the color mode.

Figure 1B:
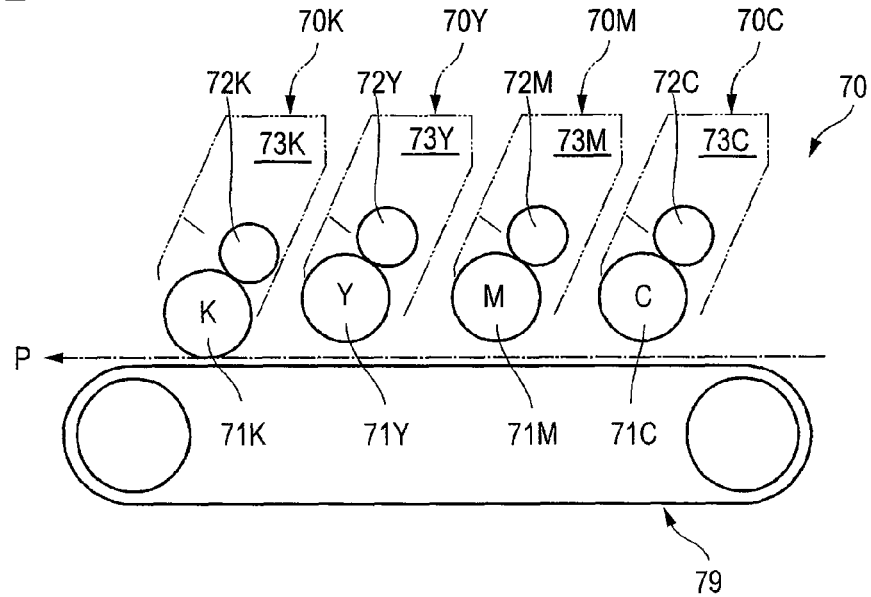

Furthermore, as shown in FIG. 1B, the printing unit 70 allows the switching unit to move the three photosensitive materials 70C, 70M, and 70Y except the photosensitive material 70K away from the conveying path P, so that a monochrome image can be printed on a sheet using only the black (K) toner. FIG. 1B shows the monochrome mode.

1.2 Switching Unit

The switching unit is configured to have a hoisting and lowering mechanism. As shown in FIG. 1A, the switching unit lowers the three photosensitive materials 70C, 70M, and 70Y close to the conveying path P. As shown in FIG. 1B, the switching unit also lifts the three photosensitive materials 70C, 70M, and 70Y away from the conveying path P, thereby switching the printing unit 70 between the color mode and the monochrome mode.

When the controller receives a job transmitted from an external information terminal, the controller provides control as appropriate to activate the switching unit based on the job. Then, the switching unit performs a switching operation to raise or lower the photosensitive materials 70C, 70M, and 70Y, thereby switching between the color mode upon printing a color page as shown in FIG. 1A and the monochrome mode upon printing a monochrome page as shown in FIG. 1B. In addition, a switching time TC (generally, on the order of a few seconds to a few tens of seconds) is required from the start to the end of the switching operation.

2. Controller

As described above, as shown in FIG. 2 and FIG. 3, the controller not only controls the printing unit 70, the switching unit, and other components but also executes as appropriate a switching operation limiting routine (step S100 to step S130) for allowing the switching unit to restrict the switching operation.

More specifically, the switching operation limiting routine is executed when a time limit has been specified for the printing unit 70 to print an image on a sheet based on a job. As will be detailed below, in the switching operation limiting routine, the number of switching actions is reduced to such an extent that allows for completing the printing by the time limit. The switching time is accordingly reduced to shorten the printing turnaround time. Furthermore, the switching operation limiting routine will not excessively reduce the number of switching actions with respect to the time limit, so that the number of as many monochrome pages as possible is reduced which should be printed primarily in the monochrome mode but printed in the color mode, thereby suppressing the execution of printing in the color mode.

Here, when at least one of the automatic power supply OFF time of the printing apparatus, the automatic correction start time, the automatic cleaning start time, the automatic FAX receipt time, and the printing time limit defined by the user is designated, the time limit is one of these which is extracted by the controller as the time that comes first. In this embodiment, description will be made for a case where the time limit is the printing start time of a next job.

More specifically, suppose that there is another job (hereinafter referred to as "job 2") received by the controller prior to the current job (hereinafter referred to as "job 1") that the controller has just received and started to process. In this case, "the printing start time of the next job" refers to the printing start time of the job 2 which is computed by the controller based on a time-designated printing setting when the control information accompanied with the job 2 contains the time-designated printing setting.

Figure 5:
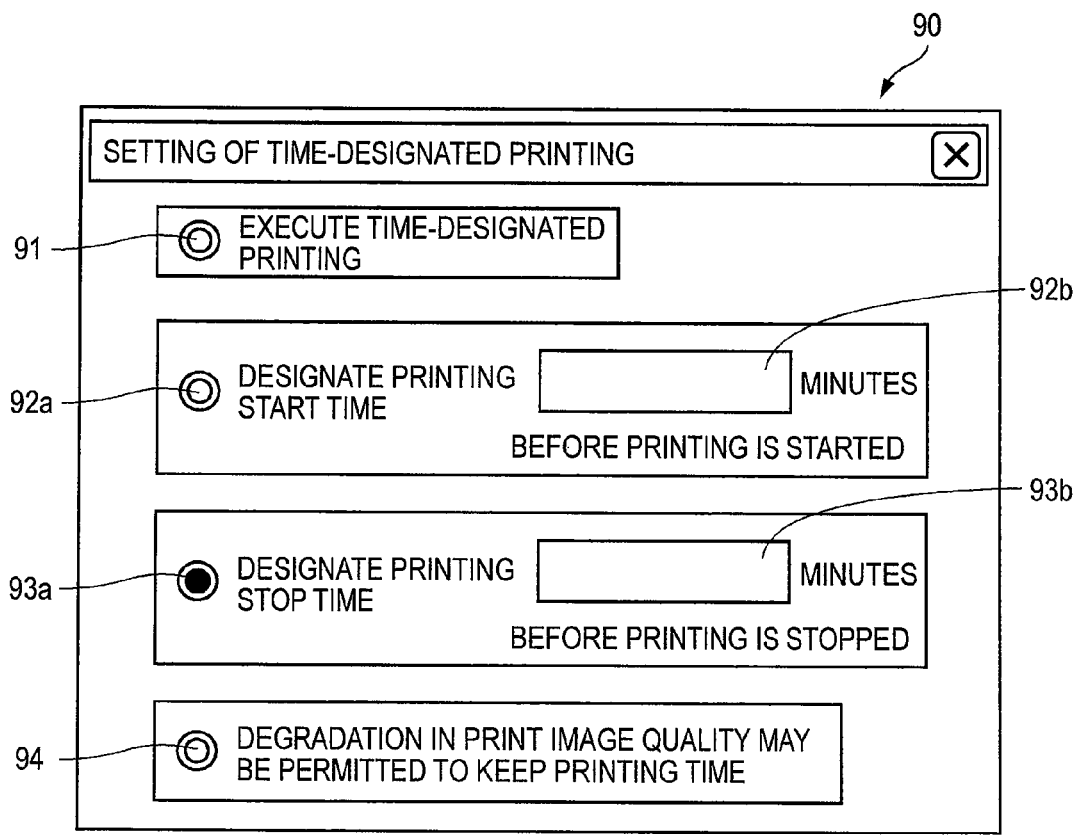
FIG. 5 relates to the printing apparatus according to the first embodiment, illustrating an explanatory view of a "Setting of time-designated printing" user interface.

Here, description will be made for the time-designated printing setting for a job. For example, the time-designated printing setting for a job is made on a user interface 90 of the "Setting of time-designated printing" as shown in FIG. 5.

The user interface 90 is displayed on the display device such as an information terminal device operated by a user. At the top of the user interface 90, there is located an "Execute time-designated printing" check button 91. To execute the time-designated printing for a job to be printed, the user checks the check button 91.

Below the check button 91, there is located a "Designate printing start time" check button 92a. To designate the printing start time, the user checks the check button 92a, and then sets the printing start time at a "Minutes before printing is started" setting box 92b on the right-hand side of the check button 92a. The check button 92a and the setting box 92b correspond to the first designating unit for designating the printing start time.

Below the check button 92a, there is located a "Designate printing stop time" check button 93a. To designate the printing stop time, the user checks the check button 93a, and then sets the printing stop time at a "Minutes before printing is stopped" setting box 93b on the right-hand side of the check button 93a. The check button 93a and the setting box 93b correspond to the second designating unit for designating the printing stop time.

Below the check button 93a, there is located a "Degradation in print image quality may be permitted to keep printing time" check button 94. Since restricting the switching operation to print a monochrome page in the color mode may cause degradation in print image quality, the user checks the check button 94 when degradation in print image quality can be permitted. When the check button 94 has not been checked, the system results in the fine mode that does not permit degradation in print image quality.

In this manner, the contents of the settings for the time-designated printing made by the user using the user interface 90 are to be reflected in the control information accompanied with the job. Upon receiving the job accompanied by the control information, the controller processes the control information to compute the printing start time of the job. For example, for the job accompanied by the control information " minutes before the printing is stopped," the controller computes the printing stop time of the job as the time  minutes after the job was received. Furthermore, considering the printing turnaround time of the job, the controller is to compute the printing start time of the job. In addition, the printing start time or the printing stop time may be designated not in the aforementioned form as " minutes later" from the current time but in the form of a specific time as " minutes after ** o'clock" (however, within the range from the current time to the time available for reservation of the printing).

Figure 2:
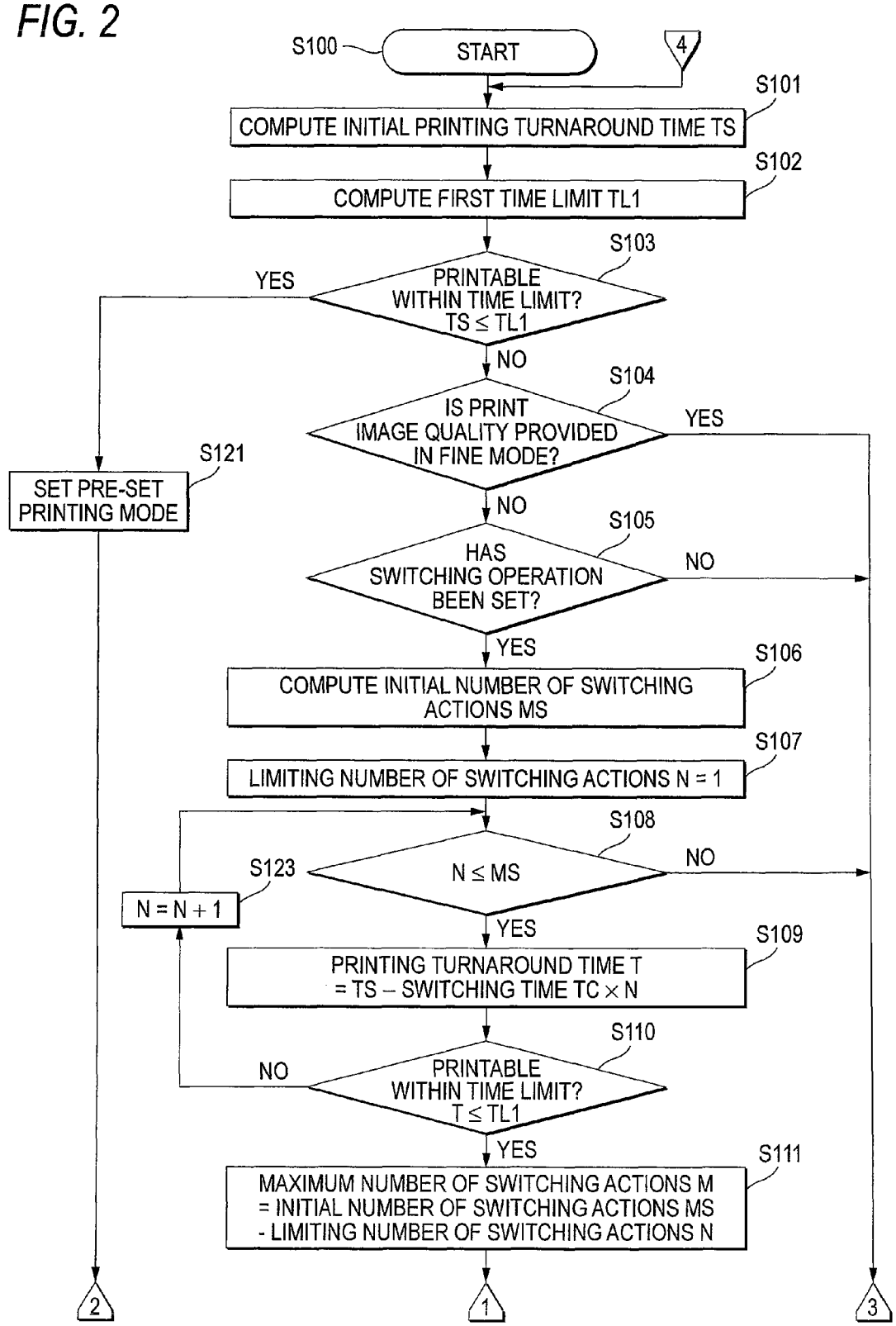
FIG. 2 relates to the printing apparatus according to the first embodiment, showing a flowchart of a switching operation limiting routine.
Figure 3:
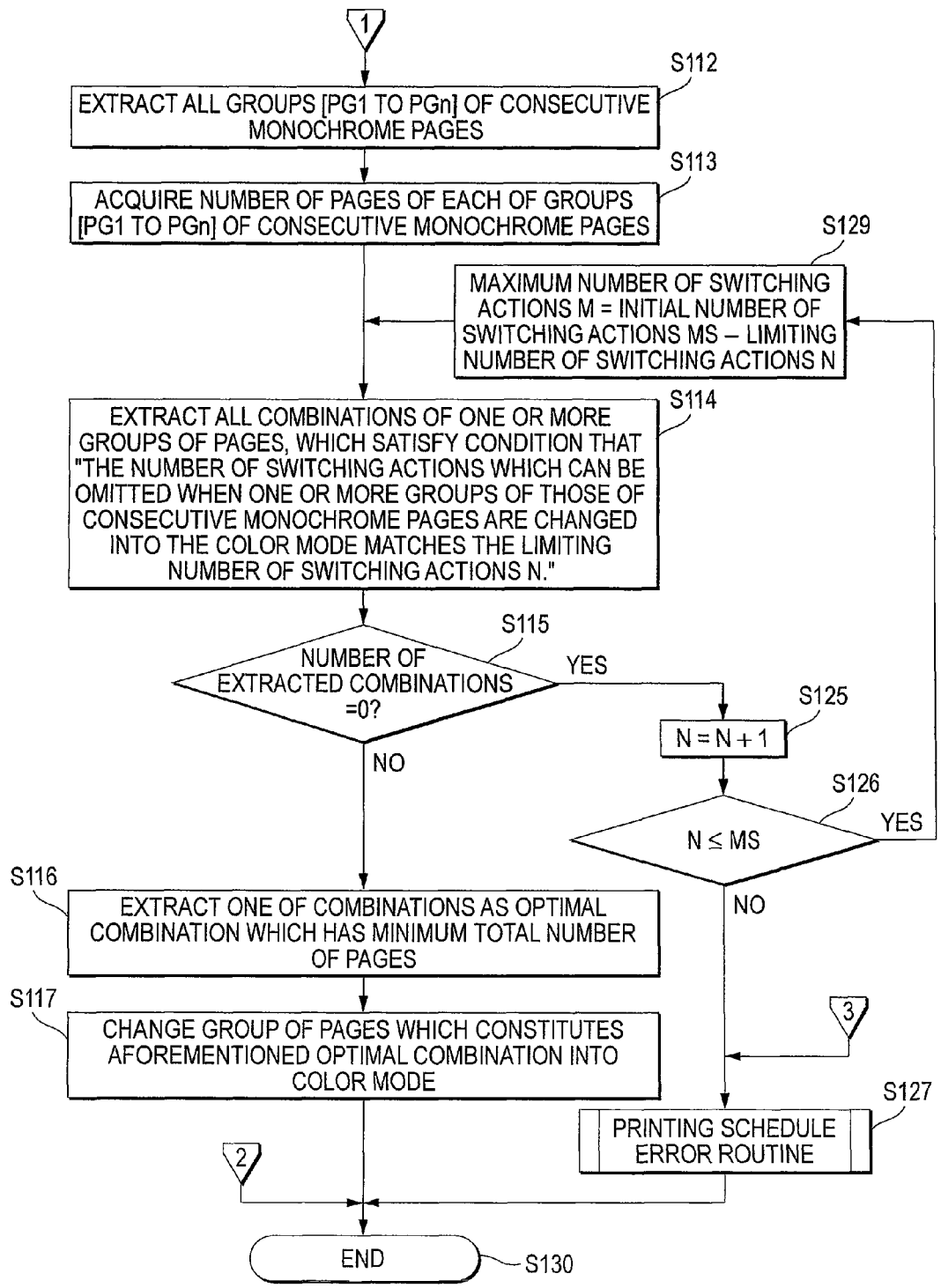
FIG. 3 relates to the printing apparatus according to the first embodiment, showing a flowchart of the switching operation limiting routine.

For the job 2, when the printing start time (or the printing stop time) is designated at the aforementioned Setting of time-designated printing and the limiting unit receives the job 1 after having received the job 2, the process performs the switching operation limiting routine shown in FIG. 2 and FIG. 3.

First, the switching operation limiting routine is started in step S100. Then in step S101, the process computes the initial printing turnaround time TS for the job 1.

Here, the initial printing turnaround time TS refers to the time required from the printing start time to the printing stop time when the job 1 is allowed to print a color page in the color mode and a monochrome page in the monochrome mode without restricting the switching operation. The initial printing turnaround time TS is computed based on the switching time TC required for the switching operation.

More specifically, when the job 1 includes the groups of pages (P1 to P7) of a configuration example 1 shown in FIG. 8, it holds that the initial printing turnaround time TS=[the total number of pages (6 pages) of the groups of consecutive color pages (P2, P4, P6)]×[the printing turnaround time for one color page]+[the total number of pages (10 pages) of the groups of consecutive monochrome pages (P1, P3, P5, P7)]×[the printing turnaround time for one monochrome page]+[the switching time TC×the number of switching actions (6 times)].

Next, in step S102, the process computes a first time limit TL1. Here, the first time limit TL1 refers to the time from the printing start time of job 1 to the printing start time of the job 2 as a time limit.

Next, in step S103, if the initial printing turnaround time TS is equal to or less than the first time limit TL1, then this means that the printing of the job 1 can be completed by the printing start time of the job 2. Thus, the process proceeds to step S121. In step S121, the printing of the job 1 is set so as to be executed without restricting the switching operation. Then, the process proceeds to step S130 (see FIG. 3), and exits the switching operation limiting routine.

On the other hand, in step S103, if the initial printing turnaround time TS is greater than the first time limit TL1, then this means that the printing of the job 1 cannot be completed by the printing start time of the job 2. Thus, the process proceeds to step S104.

Figure 4:
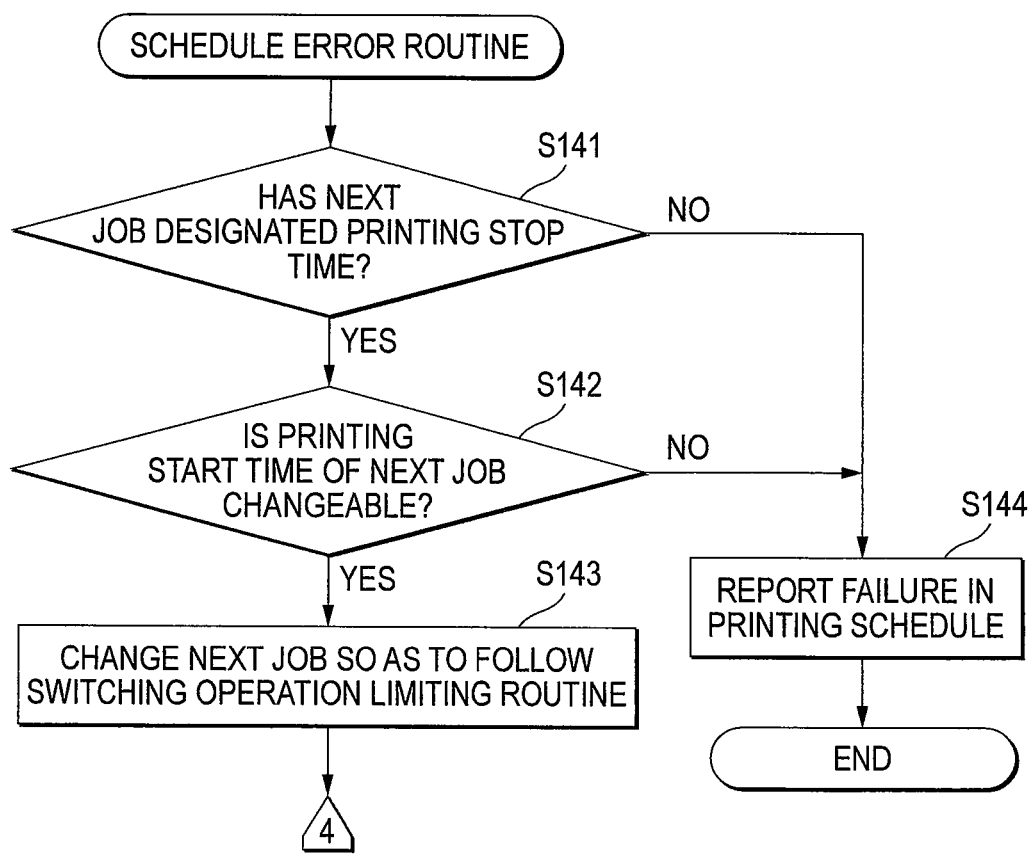
FIG. 4 relates to the printing apparatus according to the first embodiment, showing a flowchart of a printing schedule error routine.

Next, in step S104, it is judged whether the fine mode is set to permit no degradation in print image quality of the job 1, that is, the check button 94 has not been checked. Here, restricting the switching operation may cause degradation in print image quality when a monochrome page is printed as a color page. Accordingly, when the fine mode is set for the job 1, the switching operation cannot be restricted. Thus, since the printing of the job 1 cannot be completed by the printing start time of the job 2, the process proceeds to step S127 (see FIG. 3) to perform a printing schedule error routine (step S141 to step S144 shown in FIG. 4, to be discussed in more detail later) Then, the process proceeds to step S130 to exit the switching operation limiting routine.

On the other hand, in step S104, when the fine mode is not set, the process proceeds to step S105.

Next, in step S105, it is judged whether the switching operation is set for the job 1. This switching operation is set, for example, in the print setting before the user sends the job 1. Then, when the switching operation is not set for the job 1, the process proceeds to step S127 (see FIG. 3). Since the printing of the job 1 cannot be completed by the printing start time of the job 2, the process performs the printing schedule error routine. Then, the process proceeds to step S130 to exit the switching operation limiting routine.

On the other hand, in step S105, when the switching operation is set for the job 1, the process proceeds to step S106.

In step S106, the process computes the initial number of switching actions MS for the job 1. Here, the initial number of switching actions MS refers to the number of switching actions taken when the switching operation is faithfully performed without restricting the switching operation for the job 1. In addition, the switching operation being faithfully performed means that the printing mode is definitely switched from the color mode to the monochrome mode or from the monochrome mode to the color mode each time the printing operation is changed from a color page to a monochrome page or from a monochrome page to a color page.

More specifically, when the job 1 includes groups of pages (P1 to P7) of the configuration example 1 shown in FIG. 8, the initial number of switching actions MS is 6 times.

Next, in step S107, an initial setting N=1 is made for the limiting number of switching actions N.

Next, in step S108, if the limiting number of switching actions N is greater than the initial number of switching actions MS, then the process proceeds to step S127 (see FIG. 3). Since the printing of the job 1 cannot be completed by the printing start time of the job 2, the process performs the printing schedule error routine. Then, the process proceeds to step S130 to exit the switching operation limiting routine.

On the other hand, in step S108, if the limiting number of switching actions N is equal to or less than the initial number of switching actions MS, then the process proceeds to step S109.

Next, in step S109, the process computes the printing turnaround time T for the switching operation restricted N times. More specifically, the printing turnaround time T=[the initial printing turnaround time TS]−[the switching time TC]×[the limiting number of switching actions N].

Next, in step S110, when the printing turnaround time T is greater than the first time limit TL1, this means that even the switching operation being restricted N times would not allow the printing of the job 1 to be completed by the printing start time of the job 2. Thus, the process proceeds to step S123 to add 1 to N, and thereafter, repeats step S108 to step S110 again.

On the other hand, in step S110, if the printing turnaround time T is equal to or less than the first time limit TL1, this means that the switching operation being restricted N times allows the printing of the job 1 to be completed by the printing start time of the job 2. Thus, the process proceeds to step S111.

Next, in step S111, the process sets the maximum number of switching actions M at which the printing turnaround time T is not more than the first time limit TL1. Here, the maximum number of switching actions M=[the initial number of switching actions MS]−[the limiting number of switching actions N]. In addition, the maximum number of switching actions M that was set in step S111 may be modified in step S129 depending on the result of determination in step S115, to be discussed later.

Next, in step S112 shown in FIG. 3, the process extracts all groups of consecutive monochrome pages from the groups of pages [PG1 to PGn] which constitute the job 1.

Next, in step S113, the process acquires the number of pages of each group of consecutive monochrome pages.

Next, in step S114, the process extracts all the combinations of one or more groups of pages, which satisfy the condition that "the number of switching actions which can be omitted when one or more groups of those of consecutive monochrome pages are changed into the color mode matches the limiting number of switching actions N."

Next, in step S115, if the aforementioned number of extracted combinations is zero, then this means that the maximum number of switching actions M that has been set in step S111 cannot be practically achieved. Thus, the process proceeds to step S125 to add 1 to the limiting number of switching actions N.

Then, in step S126, if the limiting number of switching actions N is equal to or less than the initial number of switching actions MS, the process proceeds to step S129 to re-set the maximum number of switching actions M, and then returns to step S114.

On the other hand, in step S126, if the limiting number of switching actions N is greater than the initial number of switching actions MS, then the process proceeds to step S127. Since the printing of the job 1 cannot be completed by the printing start time of the job 2, the process performs the printing schedule error routine. Then, the process proceeds to step S130 to exit the switching operation limiting routine.

On the other hand, if the aforementioned number of extracted combinations is not zero, this means that the maximum number of switching actions M that has been set in step S111 can be practically achieved. Thus, the process proceeds to step S116 to extract one of the aforementioned combinations as the optimal combination which has the minimum total number of pages.

Next, in step S117, the process makes a setting change so that the groups of pages which constitute the aforementioned optimal combination are printed in the color mode. Then, the process proceeds to step S130 to exit the switching operation limiting routine.

More specifically, suppose that the job 1 includes the groups of pages of (P1 to P7) of the configuration example 1 shown in FIG. 8, and in step S111, the maximum number of switching actions M=2 and the limiting number of switching actions N=4. In this case, in step S112, the process extracts P1, P3, P5, and P7, while in S114, the process extracts three combinations [P1&P3&P7], [P1&P5&P7], and [P3&P5].

Then, with "No" in S115, the total number of pages of [P1&P3&P7]=6 pages, the total number of pages of [P1&P5&P7]=7 pages, and the total number of [P3&P5]=7 pages in step S116. Thus, the total number of pages of [P1&P3&P7] is the minimum and extracted as the optimal combination. As a result, for the groups of pages P1, P3, and P7, the print setting is changed from the monochrome mode to the color mode, eliminating the switching 1, switching 2, switching 3, and switching 6. As a result, the printing turnaround time of the job 1 is shortened by the switching time TC×4.

Furthermore, if the job 1 includes groups of pages (P1 to P7) of the configuration example 2 shown in FIG. 8, and in step S111, the maximum number of switching actions M=3 and the limiting number of switching actions N=3, then P2, P4, and P6 are extracted in step S112. However, for each of P2, P4, and P6, when a setting change is made from the monochrome mode to the color mode, the number of switching actions is reduced by two (even times). Thus, in S114, it is not possible to extract a combination which allows the number of switching actions that can be reduced to match the limiting number of switching actions N=3. Accordingly, with "Yes" in S115, in step S125, 1 is added to N, so that N=4. Then, in step S126, with "Yes" since N=4≦MS=6, M is re-set in step S129, so that the maximum number of switching actions M=2 and the limiting number of switching actions N=4. The process returns to step S114. The steps after S114 are the same as those of the configuration examples 1 discussed above, and thus description will be omitted.

Steps S106 to S111, S112 to S115, S123, and S125 to 126 correspond to the first computing unit for computing, based on the switching time TC, the maximum number of switching actions M at which the printing turnaround time T of job 1 is not more than the first time limit TL1.

Furthermore, steps S112 to S117 correspond to the first limiting unit for restricting the switching operation based on the maximum number of switching actions M determined by the first computing unit.

Furthermore, step S127 corresponds to the prohibiting unit for prohibiting designation by the first designating unit when the printing turnaround time T of the job 1 exceeds the first time limit TL1 even with the number of switching actions being zero.

Next, description will be made for the printing schedule error routine (step S141 to step S144 shown in FIG. 4) which is performed in step S127.

Figure 7:
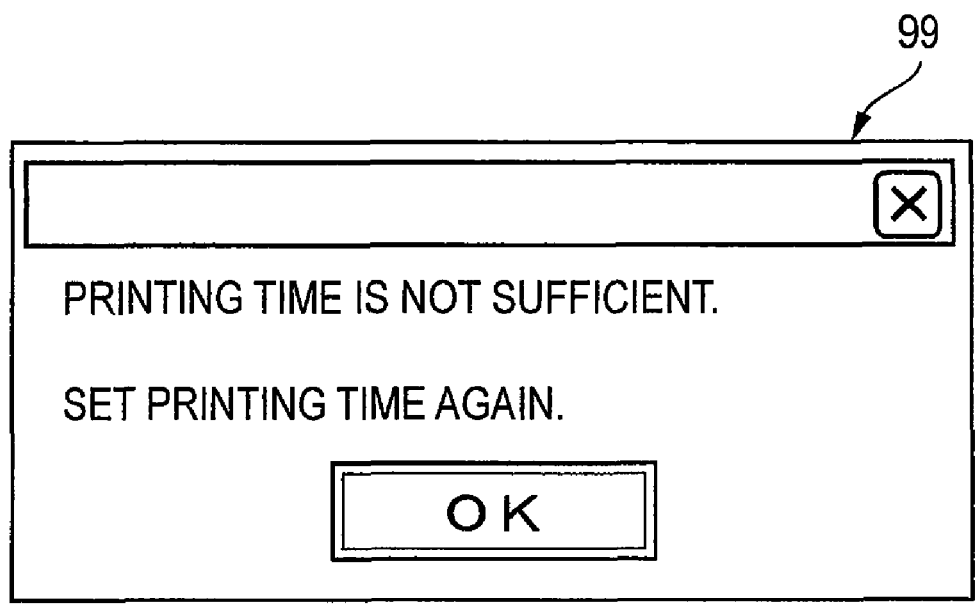
FIG. 7 relates to the printing apparatus according to the first embodiment, illustrating an explanatory view of a user interface.

In step S141, it is judged whether the printing stop time has been designated for the job 2. When the printing stop time for the job 2 has not been designated at the check button 93a and the setting box 93b (which correspond to the second designating unit) shown in FIG. 5, this means that the printing start time for the job 2 has been designated at the check button 92a and the setting box 92b (which correspond to the first designating unit). Thus, the printing start time for the job 2 has to be strictly observed, and the first time limit TL1 cannot be extended. For this reason, the process proceeds to step S144, where a user interface 99 shown in FIG. 7 is displayed on an information terminal device operated by the user. Then, since the printing start time to be set does not allow the printing of the job 1 to be completed by the printing start time of the job 2, it is reported to the user that the printing start time needs to be re-set. After that, the process exits the printing schedule error routine.

On the other hand, in step S141, for example, when the printing stop time for the job 2 has been designated at the aforementioned check button 93a and the setting box 93b, the process proceeds to step S142.

Figure 6:
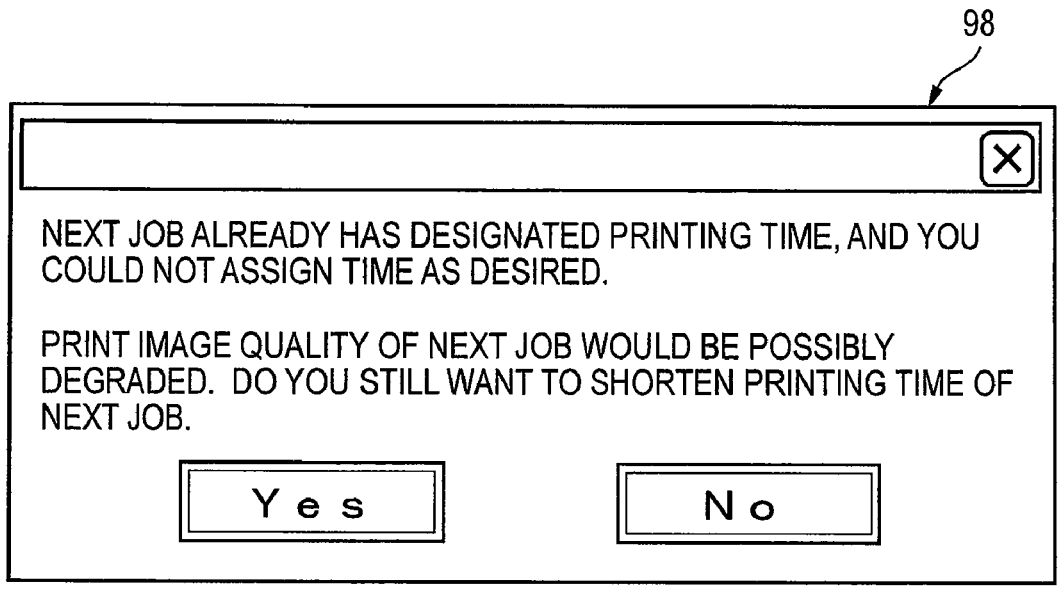
FIG. 6 relates to the printing apparatus according to the first embodiment, illustrating an explanatory view of a user interface.

Then, in step S142, it is judged whether the printing start time can be changed for the job 2. Here, a user interface 98 shown in FIG. 6 is displayed on an information terminal device operated by the user, thereby urging the user to select either the "Yes" button or the "No" button. When the "Yes" button is selected to permit the printing time of the job 2 to be shortened, it is judged that the printing start time for the job 2 can be changed. On the other hand, when the "No" button is selected not to permit the printing time of the job 2 to be shortened, it is judged that the printing start time for the job 2 cannot be changed. In addition, based on the setting made on the aforementioned "Degradation in print image quality may be permitted to keep printing time" check button 94, when the check button 94 has been checked, it is judged that the printing start time for the job 2 can be changed. When the check button 94 has not been checked, it may be judged that the printing start time for the job 2 cannot be changed. Then, when the printing start time for the job 2 cannot be changed, the process proceeds to step S144. The processing in step S144 is carried out in the same manner as described above, and thus description will be omitted.

On the other hand, in step S142, when the printing start time for the job 2 can be changed, the process proceeds to step S143. Then, in step s143, the job 1 is changed to the job 2 to be processed in the switching operation limiting routine, so that the processes subsequent to step S101 are performed. At this time, in step S101, the process computes the initial printing turnaround time TS for the job 2, and then in step S102, in place of the first time limit TL1, the process computes a second time limit TL2 from the printing stop time of job 1 to the printing stop time of the job 2. Then, subsequent to step S103, the first time limit TL1 is replaced by the second time limit TL2 to perform the subsequent processes on the job 2.

As a result, if the process for the job 2 is exited without proceeding to step S127, this means that the job 2 can be completed within the second time limit TL2, allowing the printing of both the job 1 and the job 2 to be executed on time as desired by the user.

On the other hand, in the process for the job 2, if the process proceeds to step S127, this means that the job 2 cannot be completed within the second time limit TL2. In step S127, this causes the user interface 99 shown in FIG. 7 to be displayed, reporting that the printing time for the job 1 is not sufficient.

Steps S143, S106 to S111, S112 to S115, S123, and S125 to 126 for the job 2 correspond to the second computing unit for computing, based on the switching time TC, the maximum number of switching actions M at which the printing turnaround time T from the printing start time of the job 2 to the printing stop time of the job 2 designated by the second designating unit is not more than the second time limit TL2 from the printing stop time of the job 1 to the printing stop time of the job 2.

Furthermore, steps S112 to S117 for the job 2 correspond to the second limiting unit for restricting the switching operation based on the maximum number of switching actions M determined by the second computing unit.

Furthermore, step S127 corresponds to the prohibiting unit for prohibiting designation by the first designating unit when the printing turnaround time exceeds the second time limit TL2, even with the number of switching actions determined by the second computing unit being zero.

Figure 9:
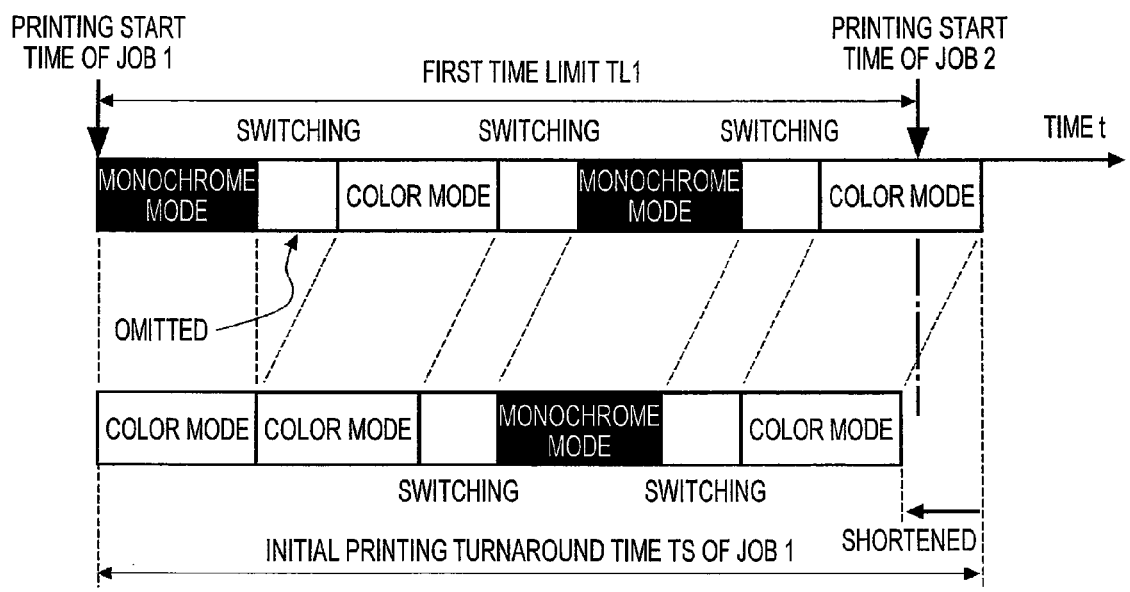
FIG. 9 relates to the printing apparatus according to the first embodiment, illustrating an explanatory view of a concrete example.

FIG. 9 illustrates a concrete example which shows the operational effects of the printing apparatus of the first embodiment. In this example, when the job 1 is printed without restricting the switching operation, the printing of the job 1 is not completed by the printing start time of the job 2. However, the first computing unit and the first limiting unit can restrict three switching actions to one switching action to shorten the time required, thereby allowing the printing of the job 1 to be completed by the printing start time of the job 2. Furthermore, without excessively reducing the number of switching actions, the first computing unit and the first limiting unit reduce as many monochrome pages as possible which should be printed primarily in the monochrome mode but printed in the color mode. The execution of printing in the color mode is thus suppressed, thereby extending the service life of consumables.

Figure 10:
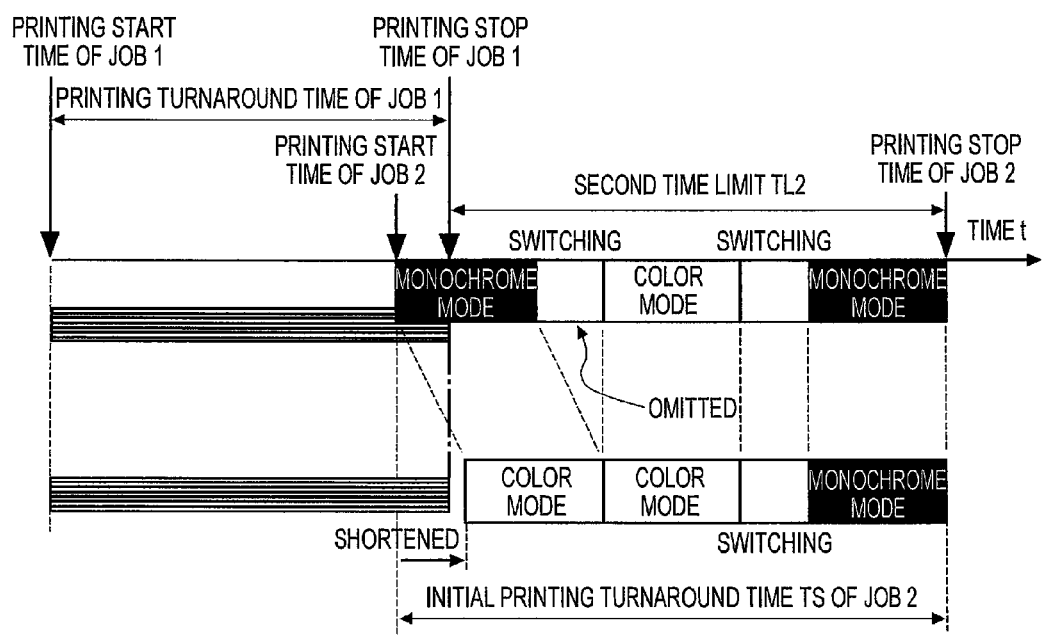
FIG. 10 relates to the printing apparatus according to the first embodiment, illustrating an explanatory view of a concrete example.

Furthermore, FIG. 10 illustrates another concrete example which shows the operational effects of the printing apparatus of the first embodiment. In this example, the printing stop time of the job 2 is designated, and based on the designation, the printing start time of the job 2 is determined. However, the setting shows that degradation in print image quality for the job 2 may be permitted. Additionally, the printing stop time of the job 1 exceeds the printing start time of the job 2 even with the number of switching actions for the job 1 being zero, or the number of switching actions cannot be restricted (the printing turnaround time cannot be shortened) because the job 1 is set to be in the fine mode or in a save mode for saving consumables (materials) such as toner. Accordingly, when the printing stop time of job 1 will exceed the printing start time of the job 2, the printing of the job 1 cannot be executed in this situation. In this case, the second computing unit and the second limiting unit can be used to restrict two switching actions of the job 2 to one switching action to shorten the time (only under the condition that the printing start time of the job 2 can be changed). This allows the printing of the job 1 to be completed by the printing start time of the job 2. Furthermore, without excessively reducing the number of switching actions, the second computing unit and the second limiting unit reduce as many monochrome pages as possible which should be printed primarily in the monochrome mode but printed in the color mode. The execution of printing in the color mode is thus suppressed, thereby extending the service life of consumables.

As described above, the printing apparatus of the first embodiment includes the aforementioned printing unit 70, the switching unit, the first computing unit, and the first limiting unit. This configuration makes it possible to reduce the number of switching actions to such an extent that allows for completing the printing by the time limit. It is thus possible to accordingly reduce the switching time and thereby shorten the printing turnaround time.

Furthermore, this printing apparatus adopts the first computing unit so as not to excessively reduce the number of switching actions with respect to the time limit. This allows for reducing as many monochrome pages as possible which should be printed primarily in the monochrome mode but printed in the color mode, thereby suppressing the execution of printing in the color mode.

Accordingly, the printing apparatus of the first embodiment can not only shorten the printing turnaround time but also extend the service life of consumables as long as possible.

Furthermore, this printing apparatus can make the effects of the invention because the time limit is the printing start time of another job that is specified relatively often.

Furthermore, this printing apparatus adopts the aforementioned first limiting unit to reduce the number of as many monochrome pages as possible which should be printed primarily in the monochrome mode but printed in the color mode, thereby ensuring that the execution of printing in the color mode is suppressed. It is thus ensured that this printing apparatus can make use of the operational effects of the present invention.

Furthermore, this printing apparatus adopts the aforementioned first designating unit and the prohibiting unit, thereby making it possible to prevent the printing operation for the job 1 from overlapping with the printing operation for the job 2 which has to be executed after the first time limit TL1.

Furthermore, this printing apparatus adopts the aforementioned second designating unit, the second computing unit, the second limiting unit, and the prohibiting unit, thereby allowing for extending a designated range of the printing start time of the job 1 when the printing turnaround time of the job 2 can be shortened.

Second embodiment

Figure 11:
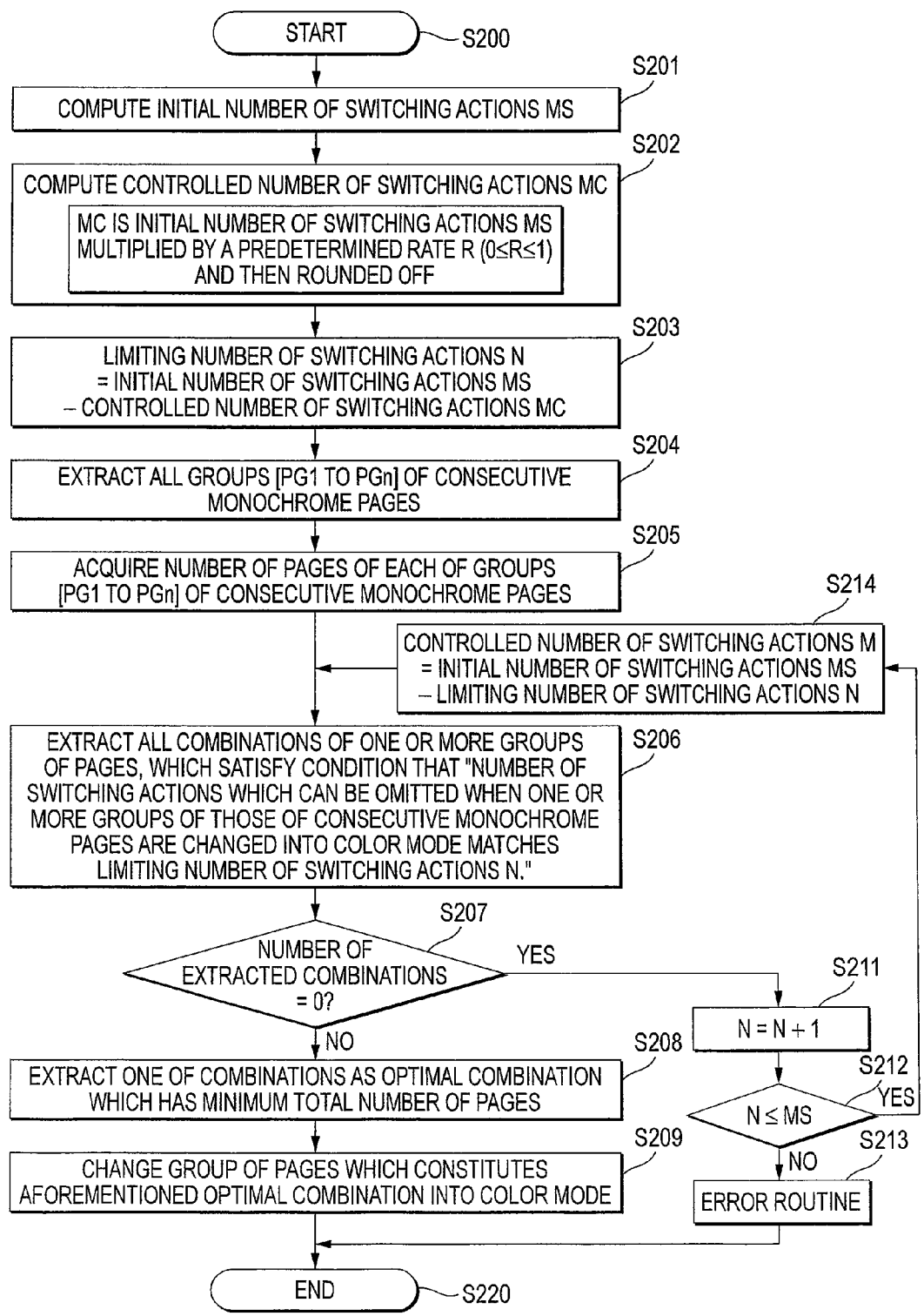
FIG. 11 relates to a printing apparatus according to a second embodiment, showing a flowchart of a switching operation control routine.

A printing apparatus of a second embodiment includes the switching operation control routine (steps S200 to S220) shown in FIG. 11 in place of the switching operation limiting routine in the printing apparatus of the first embodiment. The other components are the same as those of the printing apparatus of the first embodiment, and thus no description or only a brief description will be made for those components.

The printing apparatus of the second embodiment allows the user to pre-specify a predetermined rate R, thereby reducing the number of switching actions in the switching operation of a job generally with the rate R to execute the printing of the job.

Figure 12:
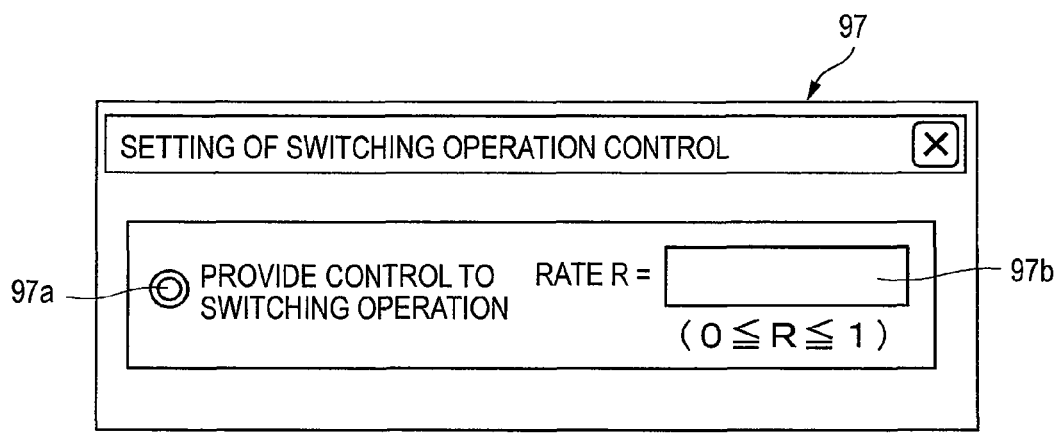
FIG. 12 relates to the printing apparatus according to the second embodiment, illustrating an explanatory view of a "Setting of switching operation control" user interface.

For example, when the user transmits a job, a "Setting of switching operation control" user interface 97 shown in FIG. 12 is appropriately displayed on the display screen of an information terminal device operated by the user.

On the interface 97, a "Provide control to switching operation" check button 97a is located, and a "Rate R" setting box 97b is located on its right-hand side.

To provide control to the switching operation, the user checks the check button 97a to enter a desired value at the setting box 97b within the range $0 \leqq R \leqq 1$, thereby providing a setting of the rate R.

In this manner, the setting contents of the switching operation control made by the user on the user interface 97 are to be reflected on the control information accompanied with the job. This user interface 97 corresponds to the setting unit for allowing the user to set the rate R.

When the controller receives a job transmitted from an external information terminal device, the controller performs the switching operation control routine based on the control information accompanied with the job.

Here, steps S204 to S209, S211, and S212 in the switching operation control routine are the same as steps S112 to S117, S125, and S126 in the switching operation limiting routine, and thus no description or only a brief description will be made. A detailed description will now be made for steps S203, S213, and S214, which are different from the switching operation limiting routine.

First, the switching operation control routine is started in step S200. Then, in step S201, the process computes the initial number of switching actions MS for the job.

In step S202, the process computes a controlled number of switching actions MC. Here, the controlled number of switching actions MC is the initial number of switching actions MS multiplied by the aforementioned rate R ($0 \leqq R \leqq 1$) and then rounded off. In addition, the controlled number of switching actions MC may be modified in step S214 depending on the result of determination in step S207, to be discussed later.

In step S203, the process computes the limiting number of switching actions N. Here, the limiting number of switching actions N=[the initial number of switching actions MS]−[the controlled number of switching actions MC]. In addition, the limiting number of switching actions N may be modified in step S211 depending on the result of determination in step S207.

In step S214, the process re-sets the controlled number of switching actions MC when the controlled number of switching actions MC determined in step S202 cannot be practically achieved. In this case, the limiting number of switching actions N is also modified in step S211.

In step S213, as an error routine, for example, it is informed to the user that the rate R having been set cannot be used to control the switching operation.

Steps S201 to S207, S211, S212, and S214 correspond to the third computing unit for reducing the number of switching actions in the switching operation at a predetermined rate R to compute the controlled number of switching actions MC.

Furthermore, steps S204 to S209 correspond to the third limiting unit for restricting the switching operation based on the controlled number of switching actions MC.

The printing apparatus of the second embodiment configured in this manner allows the user to make an entry in the check button 97a and the setting box 97b to set the rate R as desired, thereby making it possible to control the extent that the printing turnaround time of a job is shortened. Accordingly, even when the user has instructed to start the printing of a job, but the instruction was rejected because the printing cannot be completed by the time limit, the user can set to reduce the rate R on the user interface 97, thereby shortening the printing turnaround time of the job. Accordingly, this printing apparatus can reduce the number of switching actions to such an extent that allows for completing the printing by the time limit. It is thus possible to accordingly reduce the switching time TC to thereby shorten the printing turnaround time.

Furthermore, this printing apparatus allows the user to set the rate R so as not to excessively reduce the number of switching actions with respect to the time limit, thereby reducing as many monochrome pages as possible which should be printed primarily in the monochrome mode but printed in the color mode, thereby suppressing the execution of printing in the color mode.

Accordingly, the printing apparatus of the second embodiment can also shorten the printing turnaround time as well as extend the service life of consumables as long as possible.

Furthermore, even when no time limit is specified in this printing apparatus and the user wants to give a higher priority to the shortening of the printing time or the reduction of toner consumption, the user can increase or decrease the rate R as the case may be, thereby allowing for controlling the extent that the switching operation is restricted.

Furthermore, this printing apparatus adopts the aforementioned third limiting unit to reduce the number of as many monochrome pages as possible which should be printed primarily in the monochrome mode but printed in the color mode, thereby ensuring that the execution of printing in the color mode is suppressed. It is thus ensured that this printing apparatus can make use of the operational effects of the present invention.

In the foregoing, while the present invention has been described in accordance with the first and second embodiments, the present invention is not limited to the aforementioned first and second embodiments, but a variety of modifications may be made thereto as appropriate without deviating from the spirit and scope of the invention.

For example, in the schedule error routine for the printing apparatus of the first embodiment, such a step may be inserted in between step S142 and step S143 that determines whether the job 1 and the job 2 are sent by the same user. In this case, such a situation can be avoided in which the job 2 is sent by another user and the printing turnaround time for the job 2 is shortened even though another user does not want the printing turnaround time to be shortened.

Furthermore, as described in step S111 for the printing apparatus of the first embodiment, the maximum number of switching actions M and the limiting number of switching actions N have such a relationship that [the maximum number of switching actions M]=[the initial number of switching actions MS]−[the limiting number of switching actions N]. Accordingly, such an arrangement is also encompassed by the printing apparatus of the present invention in which the first computing unit computes, based on the switching time required for the switching operation, the minimum limiting number of switching actions at which the printing turnaround time from the printing start time to the printing stop time is not more than the first time limit from the printing start time to the predetermined time limit, and the first limiting unit restricts the switching operation based on the limiting number of switching actions determined by the first computing unit.

Furthermore, in the printing apparatus of the first embodiment, the "Setting of time-designated printing" user interface 90, the "Setting of switching operation control" interface 97, the user interface 98, and the user interface 99 are displayed on the display device, etc., of an information terminal device, etc., operated by the user. However, the invention is not limited to such an embodiment. For example, the aforementioned user interfaces 90, and 97 to 99 may also be displayed on a display panel provided on the printing apparatus. In this case, the user may make an entry using the control buttons provided on the printing apparatus instead of using the information terminal device.

What is claimed is:

1. A printing apparatus, comprising:
   a printing unit configured to print an image on a recording medium in a color mode or a monochrome mode based on a first job;
   a switching unit configured to perform a switching operation to switch the printing unit between the color mode upon printing a color page and the monochrome mode upon printing a monochrome page;
   a first computing unit configured to determine, based on a switching time required for the switching operation, the maximum number of switching actions that can be executed during a printing turnaround time from a printing start time to a printing stop time that is not more than a first time limit from the printing start time to a predetermined time limit; and
   a first limiting unit configured to restrict the switching operation based on a number of switching actions determined by the first computing unit.

2. The printing apparatus according to claim 1, wherein the time limit is a printing start time for a second job.

3. The printing apparatus according to claim 1, wherein the first limiting unit restricts the switching operation for one or more groups of consecutive monochrome pages in the first job, the one or more groups being restricted by the first limiting unit and having the minimum sum of pages.

4. The printing apparatus according to claim 2, further comprising:
   a first designating unit configured to designate the printing start time; and
   a prohibiting unit configured to prohibit designation by the first designating unit when the printing turnaround time exceeds the first time limit, even with the number of switching actions being zero.

5. The printing apparatus according to claim 4, further comprising:
   a second designating unit configured to designate the printing stop time;
   a second computing unit determines, based on the switching time, the maximum number of switching actions that can be executed during a printing turnaround time from the printing start time of the second job to the printing stop time of the second job designated by the second designating unit that is not more than a second time limit from the printing stop time of the first job to the printing stop time of the second job; and
   a second limiting unit configured to restrict the switching operation based on a number of switching actions determined by the second computing unit, wherein
   the prohibiting unit prohibits designation by the first designating unit when the printing turnaround time exceeds the second time limit, even with the number of switching actions determined by the second computing unit being zero.

6. A printing apparatus, comprising:
   a printing unit configured to print an image on a recording medium in a color mode or a monochrome mode based on a job;
   a switching unit configured to perform a switching operation to switch between the color mode upon printing a color page and the monochrome mode upon printing a monochrome page;
   a computing unit configured to reduce the number of switching actions in the switching operation at a predetermined rate and compute the controlled number of switching actions;
   a setting unit configured to allow a user to set the predetermined rate; and
   a limiting unit configured to restrict the switching operation based on the controlled number of switching actions.

7. The printing apparatus according to claim 6, wherein the third limiting unit restricts the switching operation for one or more groups of consecutive monochrome pages in the job, the one or more groups being restricted by the limiting unit and having the minimum sum of pages.

8. A printing apparatus, comprising:
   a printing unit configured to print an image on a recording medium in a color mode or a monochrome mode based on a first job;
   a switching unit configured to perform a switching operation to switch the printing unit between the color mode upon printing a color page and the monochrome mode upon printing a monochrome page;
   a controller configured to:
     determine, based on a switching time required for the switching operation, the maximum number of switching actions that can be executed during a first printing turnaround time from a printing start time to a printing stop time that is not more than a first time limit from the printing start time to a predetermined time limit; and
     restrict the switching operation based on the determined number of switching actions.

9. The printing apparatus according to claim 8, wherein the time limit is a printing start time for a second job.

10. The printing apparatus according to claim 8, wherein the controller is configured to restrict the switching operation for one or more groups of consecutive monochrome pages in the first job, the one or more groups being restricted and having the minimum sum of pages.

11. The printing apparatus according to claim 9, wherein the controller is further configured to:
- allow the printing start time to be designated; and
- prohibit designation when the first printing turnaround time exceeds the first time limit, even with the number of switching actions being zero.

12. The printing apparatus according to claim 11, wherein the controller is further configured to:
- allow the printing stop time of the second job to be designated;
- determine, based on the switching time, the maximum number of switching actions that can be executed during a second printing turnaround time from the printing start time of the second job to the designated printing stop time of the second job that is not more than a second time limit from the printing stop time of the first job to the printing stop time of the second job; and
- restrict the switching operation based on the determined number of switching actions that can be executed during the second printing turnaround time, and
- prohibit designation of the first printing turnaround time when the second printing turnaround time exceeds the second time limit, even with the determined number of switching actions that can be executed during the second printing turnaround time being zero.

* * * * *

UNITED STATES PATENT AND TRADEMARK OFFICE
CERTIFICATE OF CORRECTION

| | |
|---|---|
| PATENT NO. | : 8,248,623 B2 |
| APPLICATION NO. | : 12/056470 |
| DATED | : August 21, 2012 |
| INVENTOR(S) | : Kana Sakamoto |

It is certified that error appears in the above-identified patent and that said Letters Patent is hereby corrected as shown below:

Column 16, Claim 7, Line 39:
Please delete "third limiting unit" and replace with -- limiting unit --

Signed and Sealed this
Second Day of April, 2013

Teresa Stanek Rea
*Acting Director of the United States Patent and Trademark Office*